Figure 2:
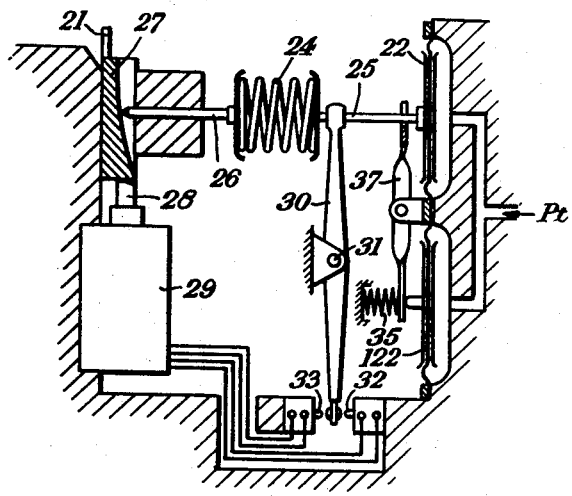

May 17, 1960   L. S. GREENLAND ET AL   2,936,976
FEEL SIMULATOR FOR AIRCRAFT

Filed Jan. 5, 1956   2 Sheets-Sheet 1

INVENTORS
LEONARD SIDNEY GREENLAND
ROY WESTBURY
CHARLES PHILIP SMITH
ATTORNEYS

United States Patent Office 2,936,976
Patented May 17, 1960

2,936,976

FEEL SIMULATOR FOR AIRCRAFT

Leonard Sidney Greenland, Wolverhampton, and Roy Westbury, Bridgnorth, Salop, England, and Charles Philip Smith, Ramsey, Isle of Man, assignors to H. M. Hobson Limited, London, England, a British company Application January 5, 1956, Serial No. 557,598

Claims priority, application Great Britain
January 12, 1955

5 Claims. (Cl. 244—83)

In aircraft fitted with power-operated control surfaces, or in which the control surfaces are operated by servo tabs, the aerodynamic loads on the control surfaces are not felt by the pilot, and it is known to provide the pilot with a feel simulator which will impose on his controls loads representative of the aerodynamic loading on the control surfaces. A hydraulic feel simulator suitable for the purpose is described in United States application No. 407,536/1954 now U.S. Patent No. 2,783,006, granted February 6, 1957.

The present invention provides, in an aircraft fitted with power-operated control surfaces or in which the control surfaces are operated by servo tabs, the combination with a control surface and a pilot's control member for actuating the control surface, of an actuator having an input member and an output member arranged to assume a position determined by the displacement of its input member from a neutral position, a device responsive to changes in airspeed for displacing the input member in opposite directions from its neutral position in response respectively to increase and decrease in airspeed, the output member of the actuator serving to vary the spring rate of the control member so that resistance to movement thereof increases with airspeed, and means operative either when a given airspeed or when a given Mach number is attained to modify, on further increase in airspeed or Mach number as the case may be, the relationship between the spring rate of the control member and airspeed.

Thus, in one embodiment of the invention, the actuator is an electromechanical actuator and the airspeed-responsive device is a pressure sensitive device, e.g. a diaphragm or bellows, subject at one side to ram pressure and at the other side to static pressure and to the loading of a spring held in compression between the diaphragm and the output member of the actuator. The input member of the actuator is constituted by a pivoted lever coupled to the diaphragm. On increase in the airspeed the diaphragm moves the input member in one direction from its neutral position causing it to operate a switch to start the actuator in one direction. This moves the output member of the actuator in the direction to increase the compression of the spring, so restoring the input member to its neutral position. On decrease in the airspeed, the diaphragm moves the input member in the other direction, so actuating another switch which starts the actuator in the other direction. The output member then permits the input member to return to its neutral position by reducing the load on the spring.

The output member of the actuator is arranged to adjust a system of springs centering the control member so that the mechanical feel provided by the springs increases with increase in airspeed.

Figure 3:
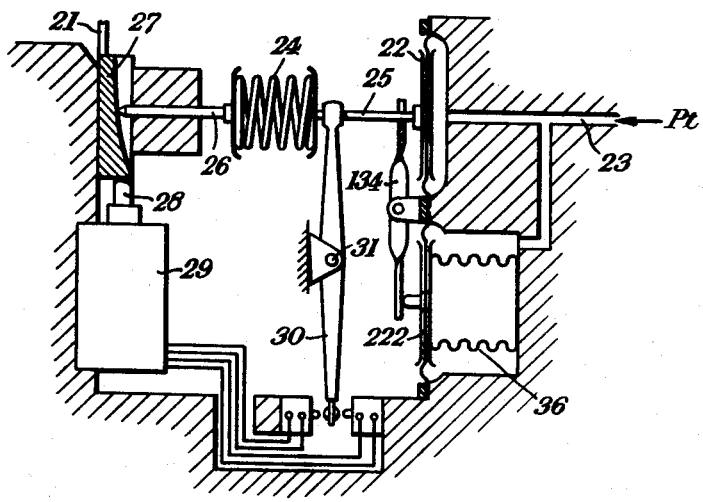
Figure 1:
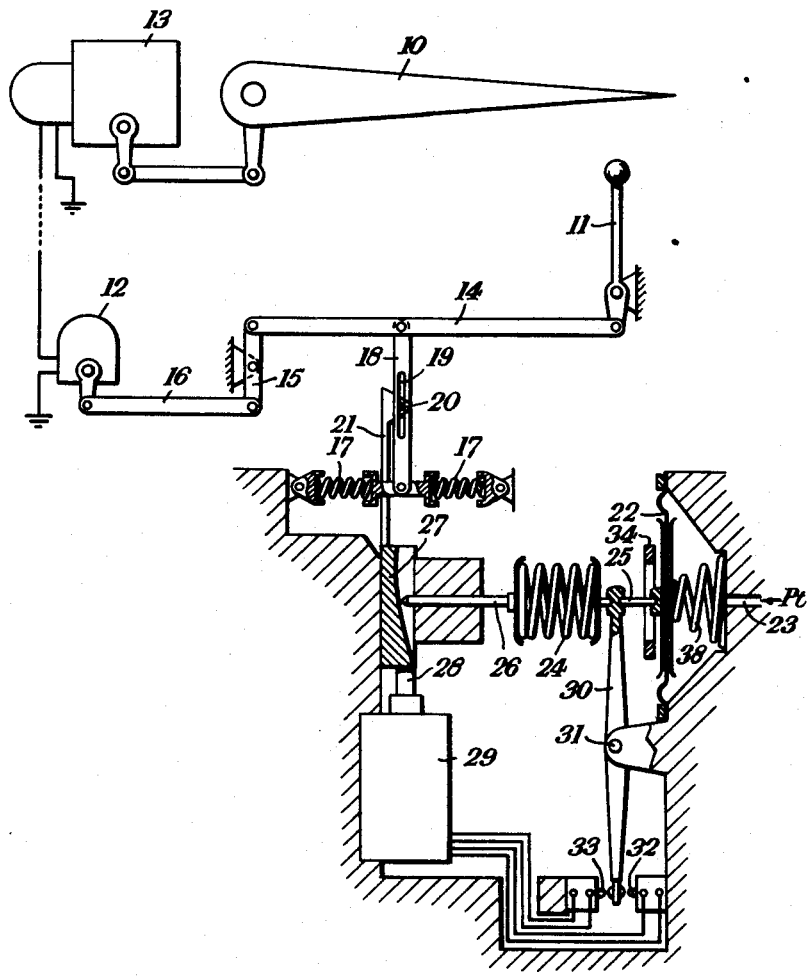

Certain embodiments of the invention will now be described in more detail, by way of example, with reference to the accompanying drawings, in which:

Fig. 1 shows diagrammatically one form of flying control system according to the invention, Fig. 2 shows a modification, and
Fig. 3 shows a further modification.

Like reference numerals designate like parts throughout the figures.

In the system shown in Fig. 1, a control surface 10 is actuated by a pilot's control lever 11 through the agency of a servo mechanism comprising a transmitter 12, connected to the lever 11 by a mechanical linkage, and a receiver 13 coupled to the control surface 10. The linkage comprises a link 14, a pivoted lever 15 and a further link 16. As will be readily understood the servo mechanism 12, 13 serves to move the control surface 10 in a direction and to an extent determined by the movement imparted to the lever 11 from a neutral position. Mechanical feel is imparted to the lever 11 by springs 17 acting on one end of a lever 18, pivoted at its other end to the link 14 and having a slot 19 engaging a pin 20 on a rod 21. As will be appreciated, the amount of feel depends on the position of the pin 20 in the slot 19.

The feel is caused to increase with airspeed V under control of a diaphragm 22, exposed at its right-hand side, through a conduit 23, to the total pressure, $P_t$, derived from the forward speed of the aircraft and exposed at its left-hand side to atmospheric pressure. The diaphragm 22 is balanced against the pressure difference across it by a spring 24, held in compression between a push rod 25 and a rod 26 bearing against a cam 27, connecting the rod 21 to the output member 28 of an electrical actuator 29. The input member of the actuator is constituted by a lever 30, pivoted intermediately at 31 and connected at its upper end to the push rod 25.

On increase in the airspeed, the total pressure $P_t$ will increase, thereby causing the diaphragm 22 to rock the lever 30 anti-clockwise and cause it to operate a switch 32 and start the actuator 29 in the direction to raise the cam 27, thereby increasing the compression of the spring 24 and restoring the lever 30 to the neutral position shown. The upward movement of the cam 27 causes the pin 20 to rise in the slot 19 and so causes the springs 17 to impart increased resistance to movement of the lever 11.

On decrease in the airspeed, the diaphragm 22 rocks the lever 30 clockwise to actuate a swtich 33. This starts the actuator 29 in the reverse direction, causing it to lower the cam 27 to reduce the compression of the spring 24 and to lower the pin 20 in the slot 19, thereby reducing the feel imparted by the springs 17.

The device, as so far described, will produce a feel force which is directly proportional to "$q$," the difference between static atmosphere pressure and the total pressure $P_t$.

If it is desired that the feel force should remain constant after a given airspeed has been attained, this may be achieved by providing a stop 34 for arresting further movement of the diaphragm 22 in the direction to increase the feel force. It is sometimes required that, above a given airspeed, the slope of the line relating feel force to "$q$" should change. This may be effected, as shown in Fig. 2, by the provision of a second airspeed responsive diaphragm 122, subject at one side to total pressure $P_t$ and at the other side to atmospheric pressure as indicated which is normally inoperative but serves, when a given airspeed is attained, to rock a lever 37 against the action of a spring 35 to a position such that the upper end of the lever bears against the diaphragm 22 and so exerts on the input member 30 of the actuator a force opposing that exerted by the diaphragm 22 and increasing with airspeed.

Alternatively, as shown in Fig. 3, we may arrange for the characteristic of the feel simulator to be varied, when a given Mach number is attained, by the provision of a normally ineffective device constituted by a diaphragm 222 subject at one side to total pressure $P_t$ and at the other side to atmospheric pressure as indicated and an evacuated capsule 36 attached to the side of said diaphragm subject to total pressure. When a selected Mach number is exceeded, this device rocks a lever 134 to bring its upper end into contact with the diaphragm 22, thereby applying to the input member 30 of the actuator a force opposing that exerted thereon by the diaphragm 22.

As shown in Fig. 1 a square law spring 38 may be arranged to bear on the side of the diaphragm exposed to total pressure. The instantaneous spring rate of the spring 38 will decrease as the airspeed increases and the feel may in this way be arranged to be proportional to $V^3$.

What we claim as our invention and desire to secure by Letters Patent is:

1. In an aircraft, the combination with a control surface and a pilot's control member of power means operable by said control member to move said control surface to positions selected by the control member, spring means for opposing movement of said control member, a connection between said spring means and said control member which is adjustable to vary the resistance imposed by said spring means to movement of said control member, an actuator having an input member movable from a neutral position in opposite directions and an output member arranged to be positioned under control of said input member and to move in a direction corresponding with the direction of displacement of said input member from its neutral position, means operable by said output member for adjusting in accordance with its position said adjustable connection to vary the resistance imposed by said spring means to movement of said control member, an airspeed sensing device coupled to said input member and exerting thereon a force which increases with airspeed, a spring interposed between said output member and said input member and exerting on said input member a force which normally counterbalances the force exerted by said airspeed sensing device, a normally inoperative pressure sensitive device means operable thereby, when a predetermined flight condition is attained, to apply to said input member a force opposing the force exerted thereon by said airspeed sensing device.

2. The subject-matter of claim 1, wherein said pressure sensitive device is a diaphragm subject at one side to total pressure and at the other side to atmospheric pressure and is effective to apply said opposing force to the input member after a predetermined airspeed has been attained.

3. The subject-matter of claim 1, wherein said pressure sensitive device comprises a diaphragm at one side to total pressure and at the other side to atmospheric pressure and an evacuated capsule attached to the side of said diaphragm which is subject to total pressure and is effective to apply said opposing force to the input member after a given Mach number has been attained.

4. In an aircraft, the combination with a control surface and a pilot's control member of power means operable by said control member to move said control surface to positions selected by the control member, a mechanical linkage coupling said control member to said power means, a slotted lever pivoted at one end to said linkage and adapted to pivot on a pin engaging the slot therein, spring means acting on the other end of said slotted lever to impose mechanical feel on the control member, an electromechanical actuator having an input member and an output member, said output member carrying said pin and moving to positions controlled by said input member and in a direction determined by movement of said input member from a neutral position, a cam carried by said output member, a device responsive to airspeed coupled to said input member and arranged to exert a force thereon tending to move it from neutral position which increases with increase in airspeed, a slidably mounted rod coacting with said cam and displaceable thereby, and a spring mounted between said rod and the input member and exerting a counterbalancing force on the input member to normally maintain it in neutral position, said cam coacting with said rod on movement of said output member to adjust the loading of said spring in the sense to restore said input member to its neutral position.

5. The subject-matter of claim 4, wherein said airspeed responsive device is a diaphragm subject at one side to total pressure and at the other side to static pressure and comprising a square law spring exerting pressure on the side of said diaphragm which is subject to total pressure.

References Cited in the file of this patent

UNITED STATES PATENTS

| 2,508,883 | Knowler et al. | May 23, 1950 |
| 2,638,289 | McKellar | May 12, 1953 |

FOREIGN PATENTS

| 734,437 | Great Britain | Aug. 3, 1955 |
| 740,510 | Great Britain | Nov. 16, 1955 |

OTHER REFERENCES

"Flight Investigation of a Mechanical Feel Device in an Irreversible Elevator Control System of a Large Airplane" (Brown, Chilton, and Whitten), Technical Note 2496, published by the National Advisory Committee for Aeronautics, October 1951.